(12) United States Patent
Varanasi et al.

(10) Patent No.: US 8,955,099 B1
(45) Date of Patent: Feb. 10, 2015

(54) DISTRIBUTING AND SHARING LICENSES ACROSS NETWORK DEVICES IN A VIRTUAL PRIVATE NETWORK (VPN)

(75) Inventors: Kanti Varanasi, Santa Clara, CA (US); Kevin Peterson, Alpharetta, GA (US)

(73) Assignee: Juniper Networks, Inc., Sunnyvale, CA (US)

( * ) Notice: Subject to any disclaimer, the term of this patent is extended or adjusted under 35 U.S.C. 154(b) by 473 days.

(21) Appl. No.: 12/960,243

(22) Filed: Dec. 3, 2010

(51) Int. Cl.
*G06F 21/00* (2013.01)
*G06F 21/10* (2013.01)
*G06F 21/60* (2013.01)
*H04L 29/06* (2006.01)

(52) U.S. Cl.
CPC .............. *G06F 21/10* (2013.01); *G06F 21/105* (2013.01); *G06F 21/604* (2013.01); *H04L 63/0272* (2013.01)
USPC .............................. 726/15; 709/229; 713/182

(58) Field of Classification Search
CPC ..... G06F 21/10; G06F 21/105; G06F 21/604; H04L 63/0272
USPC ....................... 726/15; 713/200, 182; 709/229
See application file for complete search history.

(56) References Cited

U.S. PATENT DOCUMENTS

| 5,717,604 | A | * | 2/1998 | Wiggins | 709/229 |
| 2003/0018899 | A1 | * | 1/2003 | Behr et al. | 713/182 |
| 2003/0074579 | A1 | * | 4/2003 | Della-Libera et al. | 713/200 |
| 2011/0162062 | A1 | * | 6/2011 | Kumar et al. | 726/15 |

* cited by examiner

*Primary Examiner* — Syed Zaidi
(74) *Attorney, Agent, or Firm* — Fenwick & West LLP

(57) ABSTRACT

A device creates a pool of available licenses for secure network resources, and receives an unused license from a network device. The device also provides the unused license in the pool of available licenses, and receives a request for a license from another network device. The device further provides, to the other network device, the unused license from the pool of available licenses.

25 Claims, 9 Drawing Sheets

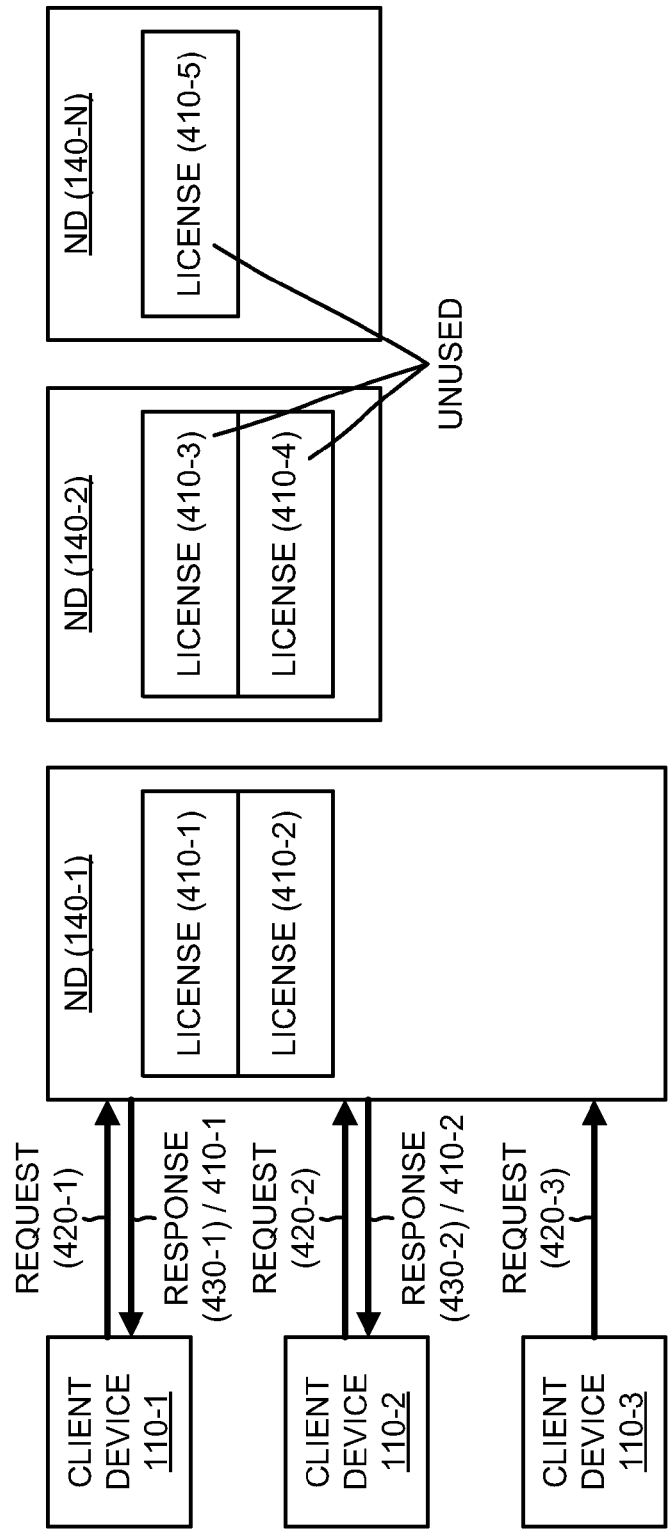

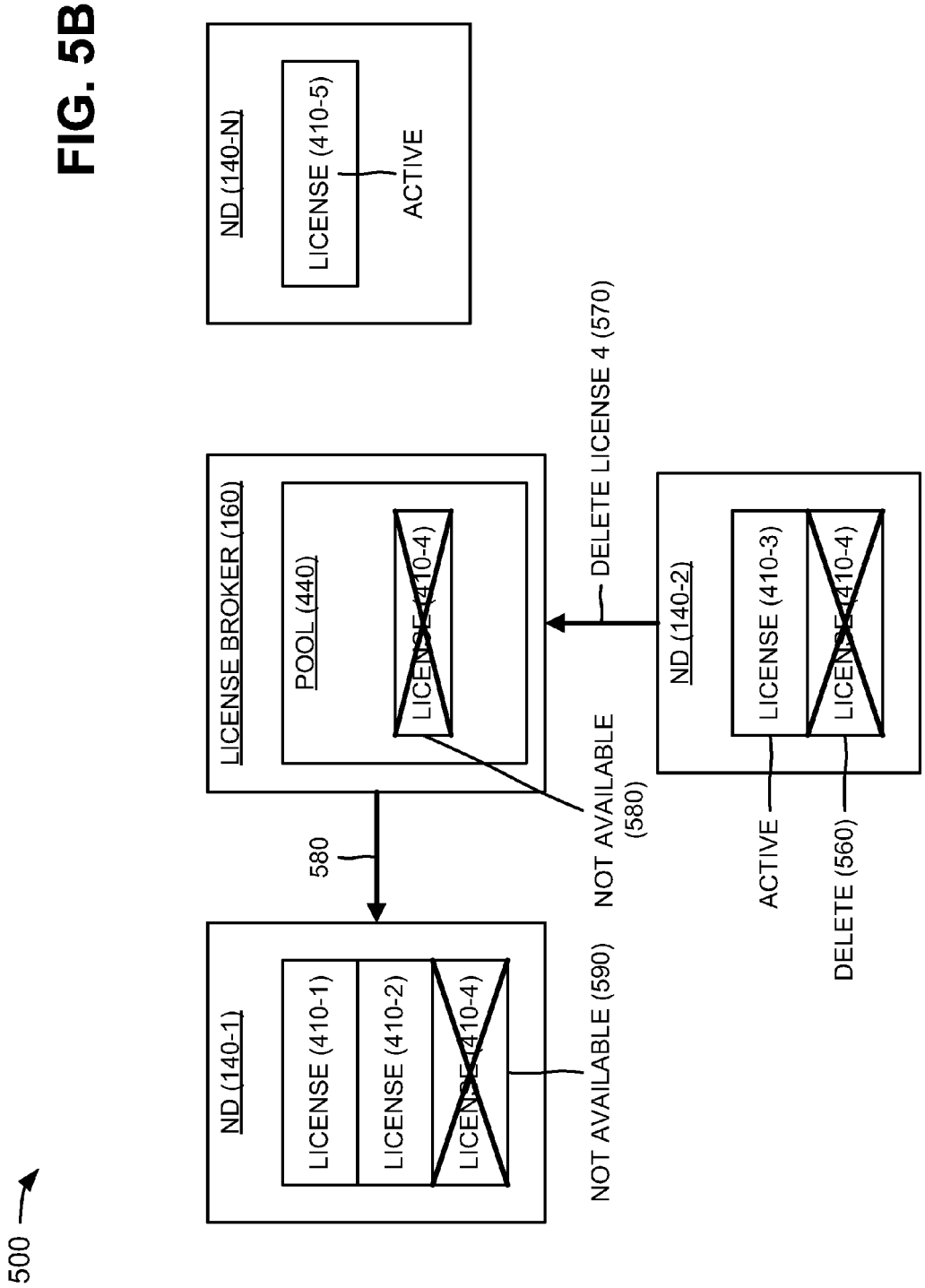

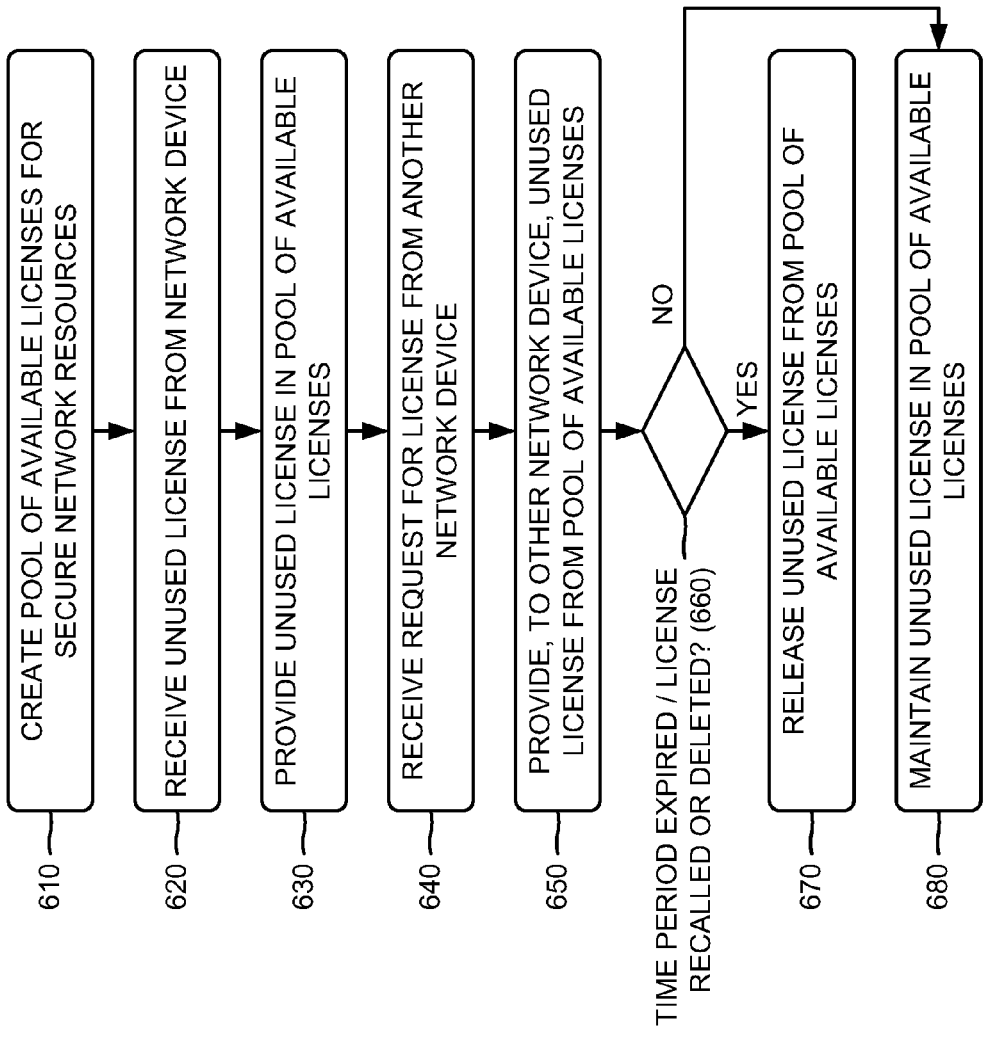

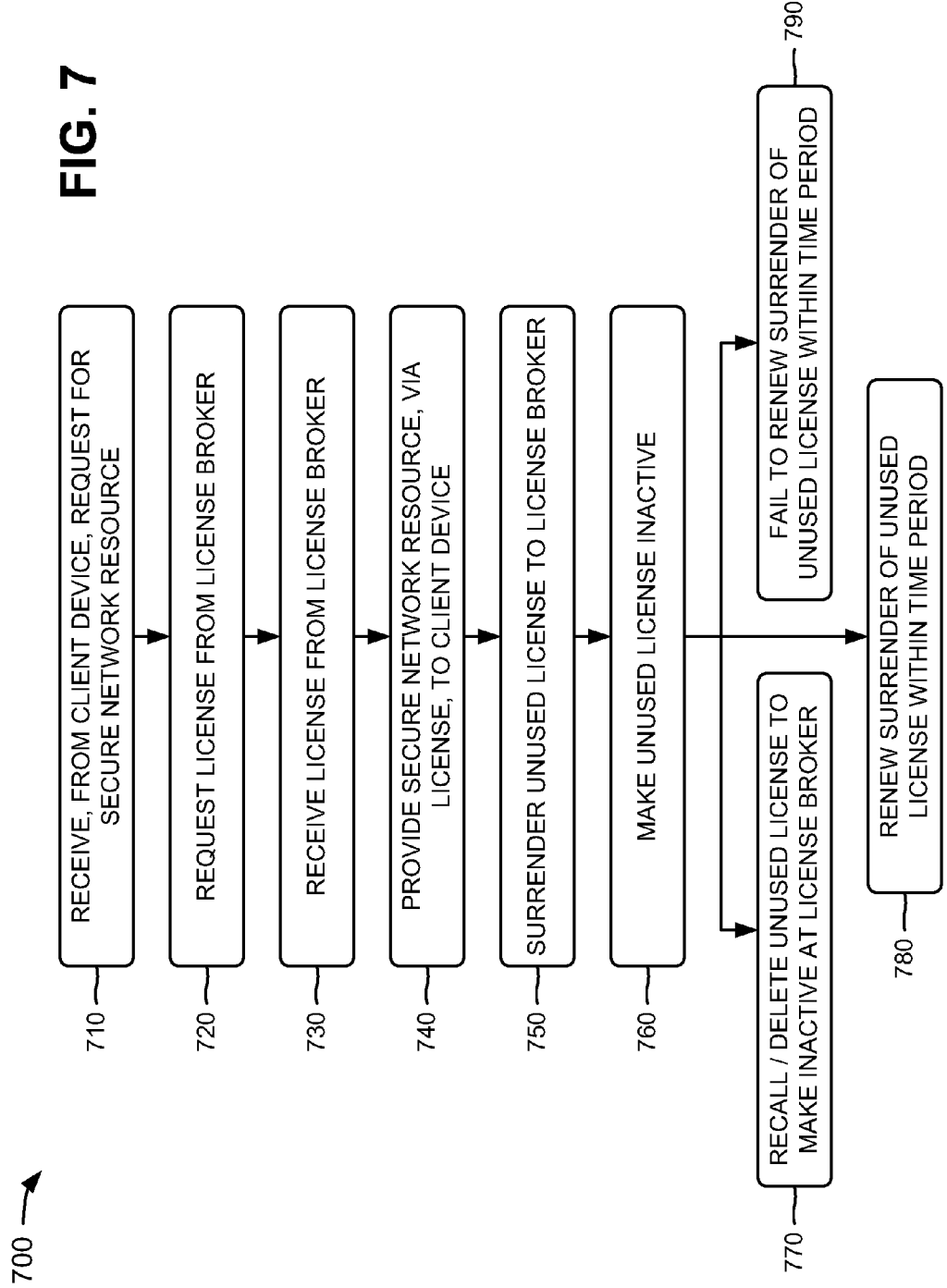

DISTRIBUTING AND SHARING LICENSES ACROSS NETWORK DEVICES IN A VIRTUAL PRIVATE NETWORK (VPN)

BACKGROUND

The Internet may include public and private networks. To send private data over a public network may require encryption of the data, especially if the private data is sensitive and/or can be modified or forged during transit. Network devices (e.g., routers, switches, etc.) may receive data on physical media (e.g., optical fiber), may analyze the data to determine its destination, and may output the data on physical media in accordance with the destination. For example, the network devices may provide network services and may verify that the correct users obtain access to certain network services.

A network device may utilize a secure VPN (e.g., a secure sockets layer (SSL) virtual private network (VPN)) to provide a client device with access to a secure network resource (e.g., secure content, corporate information, etc.). The secure VPN may use licenses to provide necessary confidentiality (e.g., preventing hackers), client authentication (e.g., preventing identity spoofing), and message integrity (e.g., preventing message alteration) to achieve the privacy intended for the secure network resource. The secure VPN may provide secure communications for the secure network resource over unsecured networks (e.g., a public network).

Network administrators may install licenses on network devices in order to implement one or more secure VPNs. However, if some of the network devices handle far less loads (e.g., traffic, such as requests for secure network resources) than other network devices, the licenses provided on the lighter loaded network devices may essentially be left unused. Furthermore, the network devices with the heavier loads may not have enough licenses to handle the heavier loads required of them.

SUMMARY

According to one aspect, a method may be implemented by a computing device. The method may include creating, by the computing device, a pool of available licenses for secure network resources, receiving, by the computing device, an unused license from a network device, and providing, by the computing device, the unused license in the pool of available licenses. The method may also include receiving, by the computing device, a request for a license from another network device, and providing, by the computing device and to the other network device, the unused license from the pool of available licenses.

According to another aspect, a computing device may include a memory to store a plurality of instructions, and a processor to execute instructions in the memory to: create a pool of available licenses for secure network resources; receive a plurality of unused licenses from one or more network devices; and provide the plurality of unused licenses in the pool of available licenses, where each of the plurality of unused licenses is available for use by other network devices.

According to still another aspect, a method may be implemented by a network device. The method may include receiving, by the network device and from a client device, a request for a secure network resource, and requesting, by the network device and based on the request, a license from a license broker device. The method may also include receiving, by the network device, the license from the license broker device, and providing, by the network device and to the client device, access to the secure network resource via the received license.

According to a further aspect, a network device may include a memory to store a plurality of instructions, and a processor to execute instructions in the memory to: receive, from a client device, a secure network resource request; request, based on the secure network resource request, a license from a license broker device; receive the license from the license broker device; store the license in the memory; and provide, to the client device, access to the secure network resource via the received license.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 4A and 4B are diagrams of example operations capable of being performed by an example portion of the network illustrated in FIG. 1;

FIGS. 5A and 5B are diagrams of example operations capable of being performed by another example portion of the network illustrated in FIG. 1;

FIG. 6 is a flow chart of an example process for distributing and sharing licenses across network devices in a VPN according to implementations described herein; and FIG. 7 is a flow chart of another example process for distributing and sharing licenses across network devices in a VPN according to implementations described herein.

DETAILED DESCRIPTION

The following detailed description refers to the accompanying drawings. The same reference numbers in different drawings may identify the same or similar elements.

Systems and/or methods described herein may distribute and share licenses across multiple network devices (e.g., routers, switches, etc.) provided in a VPN. The systems and/or methods may permit network devices (e.g., with lighter loads) to surrender unused licenses to an intermediary device (e.g., a license broker) that provides the unused licenses to other network devices (e.g., with heavier loads and in need of licenses). In one example, the license broker may redistribute the unused licenses to network devices most in need of licenses (e.g., in scenarios where some network devices handle heavier loads than other network devices). Each network device surrendering an unused licenses may recall the unused license (or delete the unused license) at any time, which may make the unused license unavailable at the license broker.

In an example implementation, the systems and/or methods may create a pool of available licenses for secure network resources, and may receive an unused license from a network device. The systems and/or methods may provide the unused license to the pool of available licenses, and may receive a request for a license from another network device. The systems and/or methods may provide, to the other network device, the unused license (or another license) from the pool of available licenses, and may determine whether a time period for surrender of the unused license has expired and whether the unused license has been recalled or deleted by the network device. If the time period has expired or the unused license has been recalled or deleted, the systems and/or methods may release the unused license from the pool of available licenses. If the time period has not expired and the unused license has not been recalled or deleted, the systems and/or methods may maintain the unused license in the pool of available licenses.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
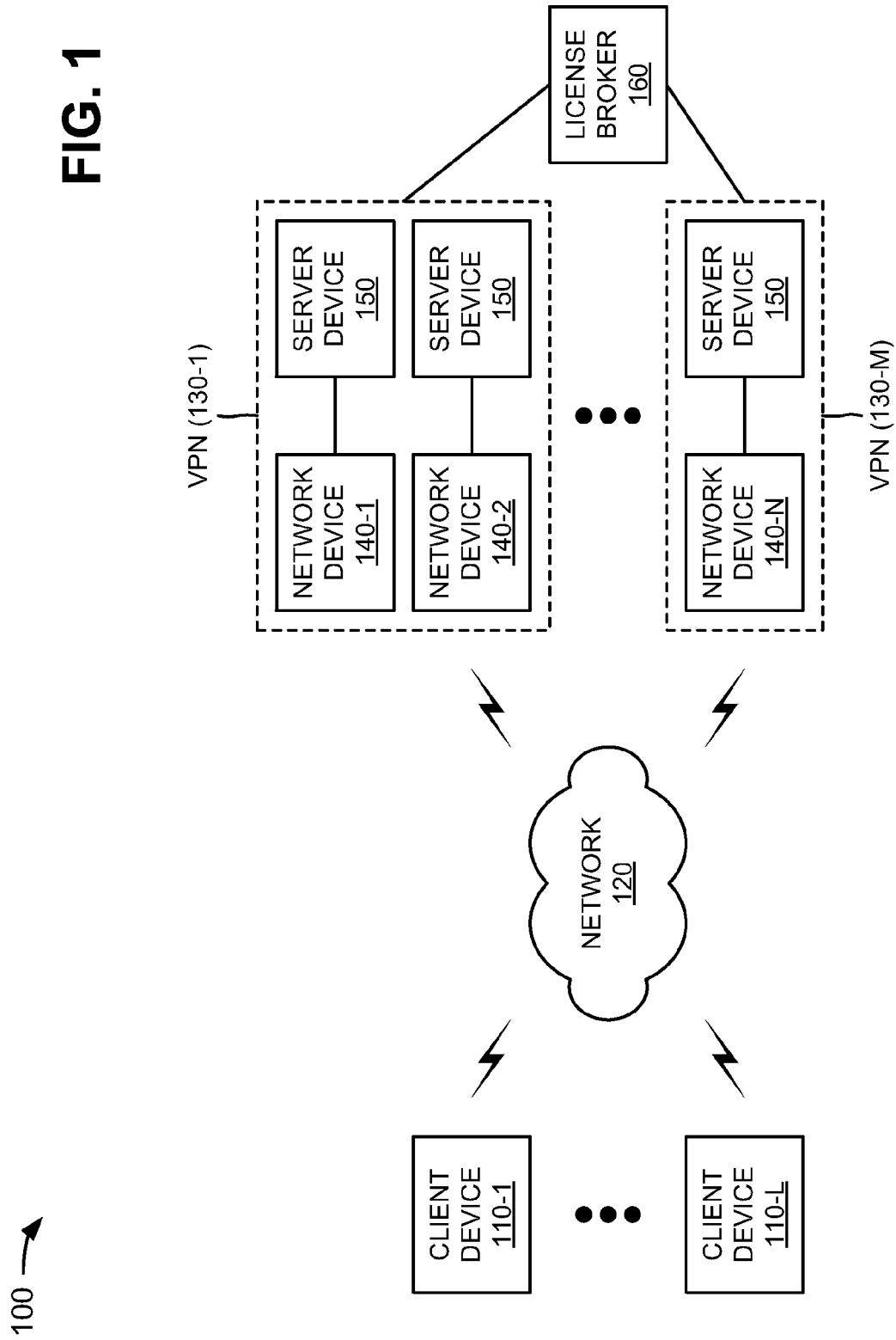
FIG. 1 is a diagram of an example network in which systems and/or methods described herein may be implemented.

FIG. 1 is a diagram of an example network 100 in which systems and/or methods described herein may be implemented. As illustrated, network 100 may include multiple client devices 110-1 through 110-L (collectively referred to herein as "client devices 110," and singularly as "client device 110"); a network 120; multiple virtual private networks (VPNs) 130-1 through 130-M (collectively referred to herein as "VPNs 130," and singularly as "VPN 130"); multiple network devices 140-1 through 140-N (collectively referred to herein as "network devices 140," and singularly as "network device 140"), multiple server devices 150, and a license broker 160. As further shown in FIG. 1, each of VPNs 130 may include one or more network devices 140 and/or server devices 150.

Components of network 100 may interconnect via wired and/or wireless connections or links. Two client devices 110, one network 120, two VPNs 130, three network devices 140, three server devices 150, and one license broker 160 have been illustrated in FIG. 1 for simplicity. In practice, there may be more client devices 110, networks 120, VPNs 130, network devices 140, server devices 150, and/or license brokers 160. Also, in some instances, one or more of the components of network 100 may perform one or more tasks described as being performed by another one or more of the components of network 100.

Client device 110 may include any device that is capable of accessing server devices 150 via network 120, VPNs 130, and network devices 140. For example, client device 110 may include a workstation computer, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a smart phone, a laptop computer, a personal computer, or other types of computation or communication devices.

Network 120 may include a public network, such as a local area network (LAN); a wide area network (WAN); a metropolitan area network (MAN); a telephone network (e.g., the Public Switched Telephone Network (PSTN)); the Internet; or a combination of networks.

VPN 130 may include a private network, such as a LAN, a company intranet, or other types of private networks. VPN 130 may also include organizational components, devices, servers, etc., such as network devices 140 and/or server devices 150, as shown in FIG. 1. In one example, VPN 130 may include a network that uses a public network (e.g., network 120) to provide remote client devices 110 with secure access to network resources (e.g., provided on server devices 150).

Network device 140 may include a traffic transfer device, such as a gateway, a router, a switch, a firewall, a network interface card (NIC), a hub, a bridge, a proxy server, an optical add-drop multiplexer (OADM), a device providing a SSL VPN, an intranet controller device, or some other type of device that processes and/or transfers traffic (e.g., packets). In one example, network device 140 may provide secure access (e.g., via licenses) to network resources (e.g., content, an email system, a service, etc.) provided by sever device 150. In another example, network device 140 may operate on traffic on behalf of an organizational network, such as VPN 130. For example, network device 140 may receive all, or substantially all, traffic destined for VPN 130 and/or transmitted by VPN 130.

Server device 150 may include may include one or more server devices, or other types of computation or communication devices, that gather, process, search, and/or provide information in a manner described herein. In one example implementation, server device 150 may include network resources that may be securely accessed by client devices 110 via network devices 140. The network resources may include, for example, content (e.g., audio content, video content, textual content, etc.); services (e.g., delivering high-definition and user-generated content, consumer and business news and information services, etc.); any network, device, application, property, and/or combinations of networks, devices, applications, and/or properties to which access may be controlled; applications and/or devices provided in a secure network, an intranet, or a local network; personal web pages; email accounts; personnel files; sales forecasts; customer information; credit card numbers; proprietary business technological formulas; transactional data; any web site requiring a login, password, user name, etc.; any network, device, application, and/or property that may require authorization and/or authentication; etc.

License broker 160 may include may include one or more server devices, or other types of computation or communication devices, that gather, process, search, and/or provide information in a manner described herein. In one example, license broker 160 may include an intermediary that enables network devices 140 to share and distribute licenses. Each license may enable network device 140 to securely provide network resources (e.g., from server devices 150) to client device 110 (e.g., via an authentication mechanism, a SSL protocol, encryption, etc.).

In one example implementation, license broker 160 may create a pool of available licenses for secure network resources (e.g., provided by server devices 150), and may receive an unused license from a first network device 140. License broker 160 may provide the unused license to the pool of available licenses, and may receive a request for a license from a second network device 140. License broker 160 may provide, to the second network device 160, the unused license (or another license) from the pool of available licenses, and may determine whether a time period (e.g., a number of days) for surrender of the unused license has expired and whether the unused license has been recalled or deleted by the first network device 140. If the time period has expired or the unused license has been recalled or deleted, license broker 160 may release the unused license from the pool of available licenses. If the time period has not expired and the unused license has not been recalled or deleted, license broker 160 may maintain the unused license in the pool of available licenses.

Once a license has been surrendered by a particular network device 140, the particular network device 140 surrendering the license may periodically contact license broker 160 to renew the license surrender. If the particular network device 140 does not renew the surrender of the license within a time period (e.g., a configurable time period set by a network administrator), license broker 160 may assume that the license is no longer surrendered and may release the license from the pool of available licenses. A surrendered license may be recalled or deleted, at any time, by/from the particular network device 140. Recalling or deleting the surrendered license by the particular network device 140 may immediately make the license unavailable at license broker 160. Furthermore, the surrendered license may be made inactive at the particular network device 140. Such an arrangement may ensure that licenses are being utilized efficiently by network devices 140 requiring the licenses, and may ensure that a particular license is not being utilized by more than one network device 140 at a time.

In another example implementation, network device 140 may receive, from client device 110, a request for a secure network resource (e.g., provided by server device 150), and may request a license from license broker 160. Network device 140 may receive a license from license broker 160, and may securely provide the requested network resource (e.g., via the license) to client device 110. Network device 140 may also surrender an unused license to license broker 160 (e.g., for use by other network devices 140), and may make the unused license inactive. Network device 140 may recall or delete the unused license in order to make the unused license inactive at license broker 160; may renew the surrender of the unused license within a configurable time period (e.g., a number of days); and/or may fail to renew the surrender of the unused license within the time period (e.g., which may make the unused license inactive at license broker 160).

Although FIG. 1 shows example components of network 100, in other implementations, network 100 may include fewer components, different components, differently arranged components, or additional components than depicted in FIG. 1.

Figure 2:
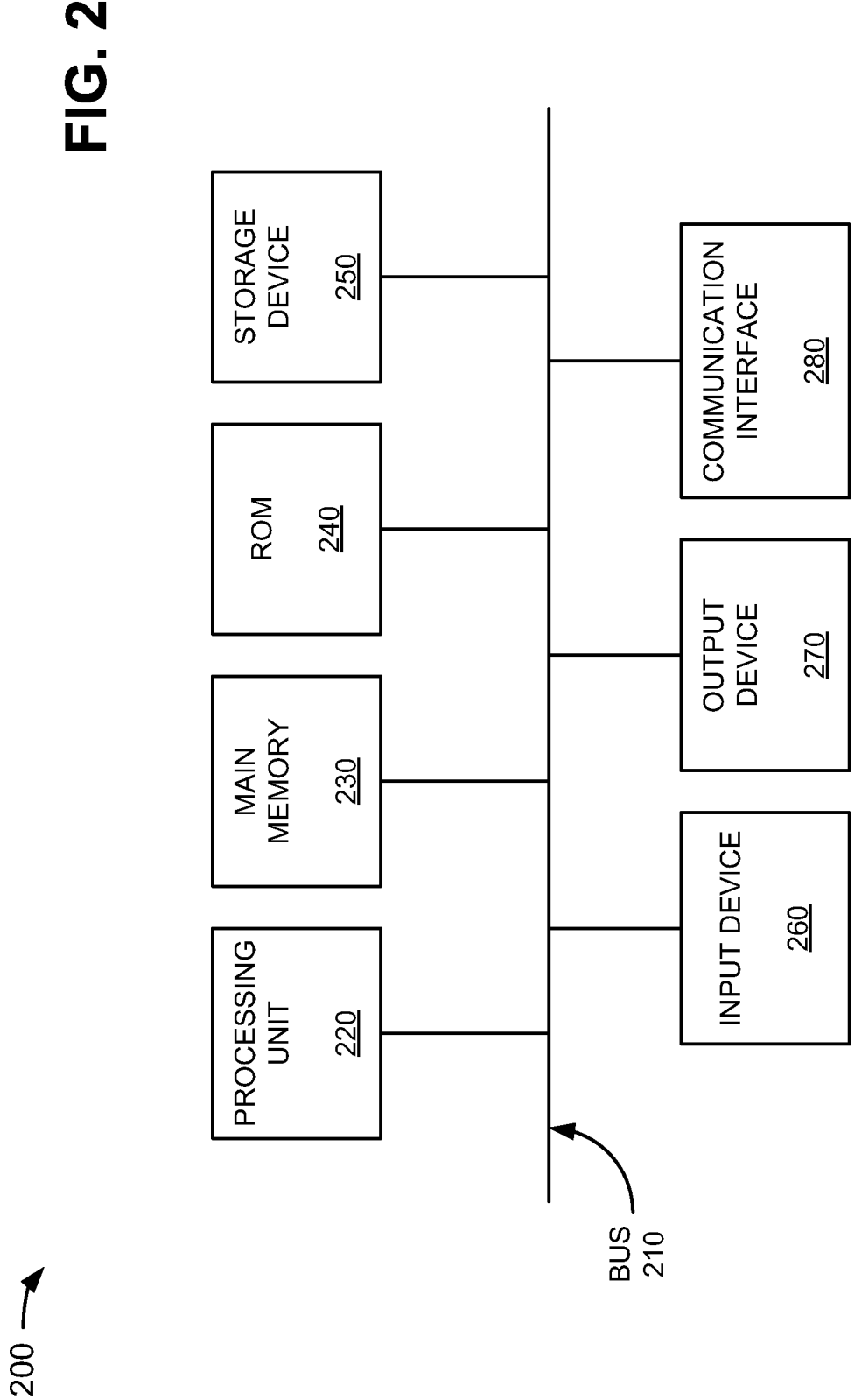
FIG. 2 is a diagram of example components of a client device, a server device, or a license broker depicted in FIG. 1.

FIG. 2 is a diagram of example components of a device 200 that may correspond to client device 110, server device 150, or license broker 160 (FIG. 1). As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, ASICs, FPGAs, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
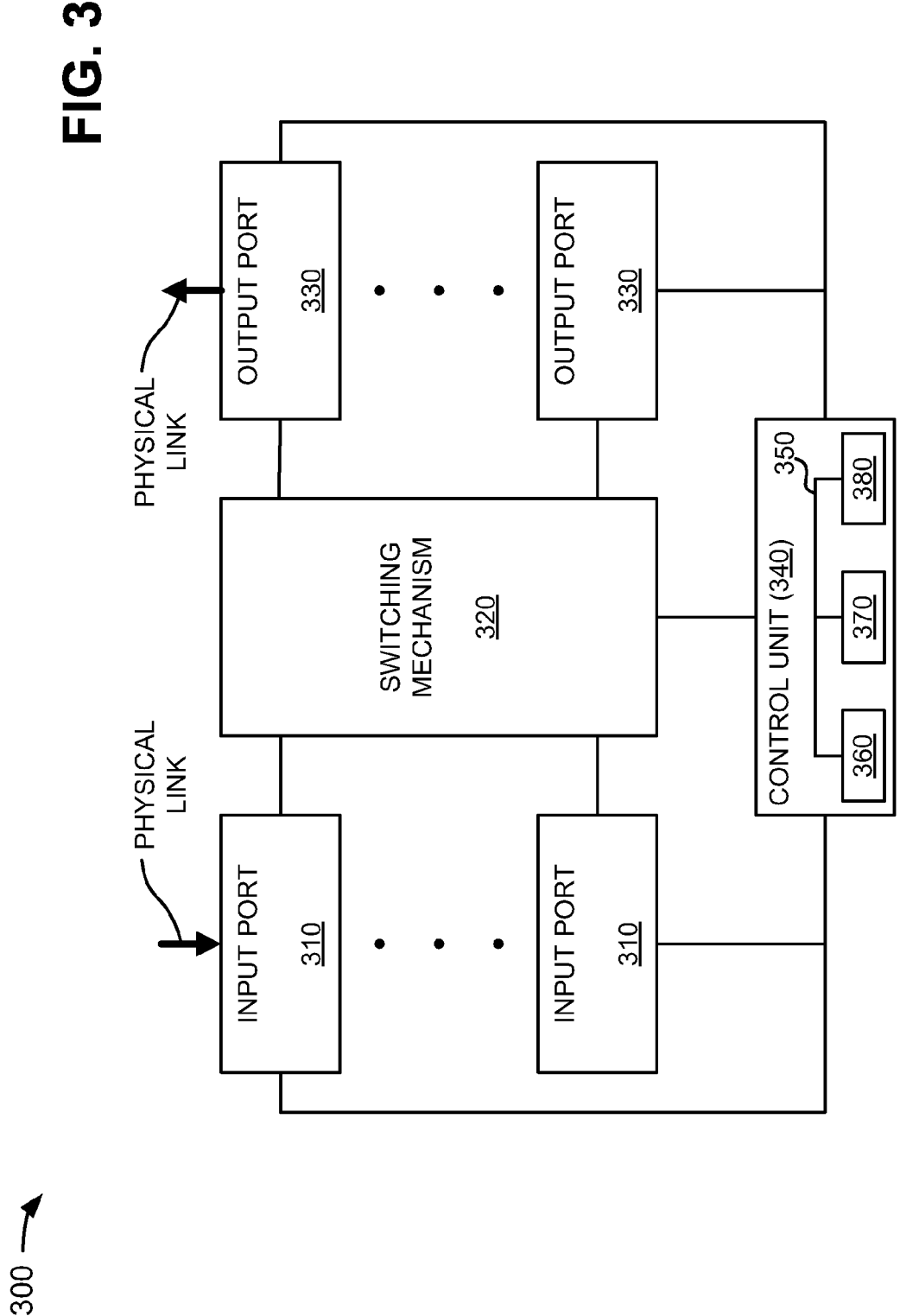
FIG. 3 is a diagram of example components of a network device depicted in FIG. 1.

FIG. 3 is a diagram of example components of a device 300 that may correspond to network device 140 (FIG. 1). As shown, device 300 may include input ports 310, a switching mechanism 320, output ports 330, and a control unit 340.

Input ports 310 may be a point of attachment for physical links and may be a point of entry for incoming traffic (e.g., packets). Input ports 310 may carry out data link layer encapsulation and decapsulation. In example implementations, input ports 310 may send (e.g., may be an exit point) and/or receive (e.g., may be an entry point) packets.

Switching mechanism 320 may interconnect input ports 310 with output ports 330. Switching mechanism 320 may be implemented using many different techniques. For example, switching mechanism 320 may be implemented via busses, crossbars, and/or with shared memories (e.g., which may act as temporary buffers to store traffic from input ports 310 before the traffic is eventually scheduled for delivery to output ports 330).

Output ports 330 may store packets and may schedule packets for service on output links (e.g., physical links). Output ports 330 may include scheduling algorithms that support priorities and guarantees. Output ports 330 may support data link layer encapsulation and decapsulation, and/or a variety of higher-level protocols. In an example implementations, output ports 330 may send packets (e.g., may be an exit point) and/or receive packets (e.g., may be an entry point).

Control unit 340 may use routing protocols and one or more forwarding tables for forwarding packets. Control unit 340 may connect with input ports 310, switching mechanism 320, and output ports 330. Control unit 340 may compute a forwarding table, implement routing protocols, and/or run software to configure and manage device 300. Control unit 340 may handle any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input ports 310, for processing by processor 360, before a packet is directed back to the shared memories (e.g., in switching mechanism 320), queued in the shared memories (e.g., based on processing results), and eventually scheduled to be sent to output ports 330. Communication interface 380 may include any transceiver-like mechanism that enables control unit 340 to communicate with other devices and/or systems.

Device 300 may perform certain operations, as described herein. Device 300 may perform these operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4B:
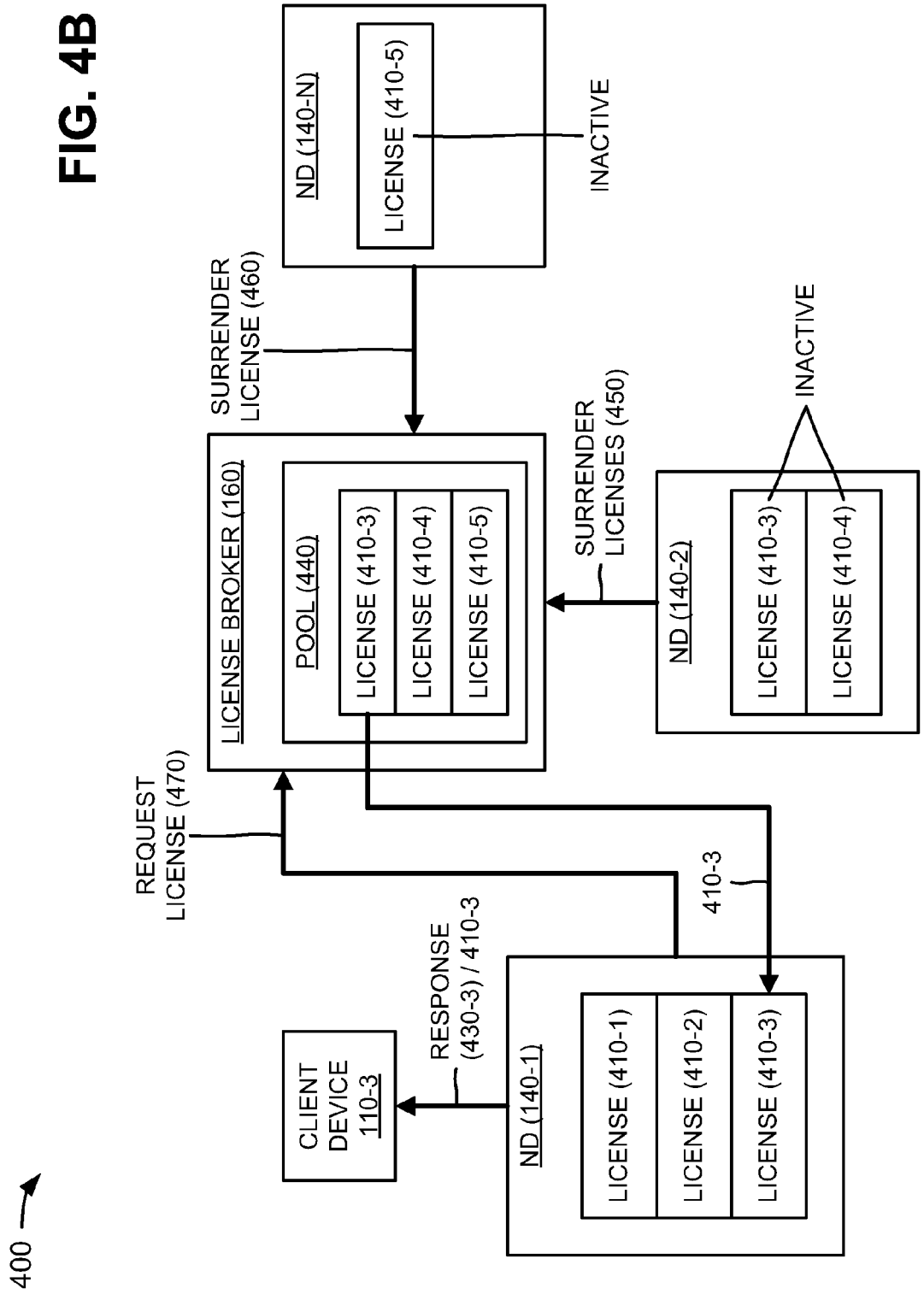

FIGS. 4A and 4B are diagrams of example operations capable of being performed by an example portion 400 of network 100. As shown in FIGS. 4A and 4B, example network portion 400 may include client devices 110-1, 110-2, and 110-3; network devices 140-1, 140-2, and 140-N; and license broker 160 (not shown in FIG. 4A). Client devices 110-1, 110-2, and 110-3; network devices 140-1, 140-2, and 140-N; and license broker 160 may include the features described above in connection with, for example, one or more of FIGS. 1-3.

As shown in FIG. 4A, network device 140-1 may include two licenses (e.g., license 410-1 and license 410-2) that enable network device 140-1 to handle requests for secure network resources (e.g., provided by server devices 150, not shown). Network device 140-2 may also include two licenses (e.g., license 410-3 and license 410-4) that enable network device 140-2 to handle requests for secure network resources. Network device 140-3 may include one license (e.g., license 410-5) that enables network device 140-2 to handle requests for secure network resources. Each of licenses 410-1 through 410-5 may enable network devices 140 to securely provide network resources (e.g., from server devices 150) to client device 110 (e.g., via an authentication mechanism, a SSL protocol, encryption, etc.).

As further shown in FIG. 4A, client device 110-1 may provide a request 420-1 for a secure network resource to network device 140-1. Client devices 110-2 and 110-3 may also provide requests 420-2 and 420-3, respectively, for secure network resources to network device 140-1. Network devices 140-2 and 140-N may not receive any requests for secure network resources from client devices 110-1 through 110-3, and licenses 410-3, 410-4, and 410-5 may be unused. Thus, in the example scenario depicted in FIG. 4A, network device 140-1 may have a heavier load than network devices 140-1 and 140-N. Network device 110-1 may provide a secure response 430-1 to request 420-1 (e.g., via license 410-1), and may provide a secure response 430-2 to request 420-2 (e.g., via license 410-2). In one example, responses 430-1 and 430-2 may include access to the requested secure network resources (e.g., requested by requests 420-1 and 420-2). As further shown in FIG. 4A, network device 140-1 may not have enough licenses to handle request 420-3.

In order to resolve this situation and as shown in FIG. 4B, network device 140-1 may lease or borrow licenses (e.g., via license broker 160) from other network devices 140 associated with network portion 400. As shown, license broker 160 may include a pool 440 of licenses available to network devices 140. In one example, license broker 160 may create and store pool 440 in a storage device (e.g., storage device 250) associated with license broker 160. Network device 140-2 may surrender licenses 410-3 and 410-4 (e.g., since they are unused) to license broker 160, as indicated by reference 450. License broker 160 may receive licenses 410-3 and 410-4, and may provide licenses 410-3 and 410-4 in pool 440. After surrendering licenses 410-3 and 410-4, network device 140-2 may render licenses 410-3 and 410-4 inactive, as further shown in FIG. 4B. Network device 140-N may surrender license 410-5 (e.g., since it is unused) to license broker 160, as indicated by reference number 460. License broker 160 may receive license 410-5, and may provide license 410-5 in pool 440. After surrendering license 410-5, network device 140-N may render license 410-5 inactive, as further shown in FIG. 4B.

Since network device 140-1 may need another license to handle request 420-3, network device 140-1 may provide a request 470 for a license to license broker 160. License broker 160 may receive license request 470, and may retrieve (e.g., based on license request 470) an unused license (e.g., license 410-3) from pool 440 of available licenses. License broker 160 may provide license 410-3 to network device 140-1, and network device 140-1 may receive and store (e.g., in memory 370) license 410-3. Network device 110-1 may provide a secure response 430-3 to request 420-3, via license 410-3. In one example, response 430-3 may include access to the requested secure network resources (e.g., requested by request 420-3). If network device 140-1 receives another request for a secure network resource, network device 140-1 may request another license from pool 440 of available licenses provided in license broker 160.

Although FIGS. 4A and 4B show example components of network portion 400, in other implementations, network portion 400 may include fewer components, different components, differently arranged components, or additional components than depicted in FIGS. 4A and 4B. Alternatively, or additionally, one or more components of network portion 400 may perform one or more other tasks described as being performed by one or more other components of network portion 400.

Figure 5A:
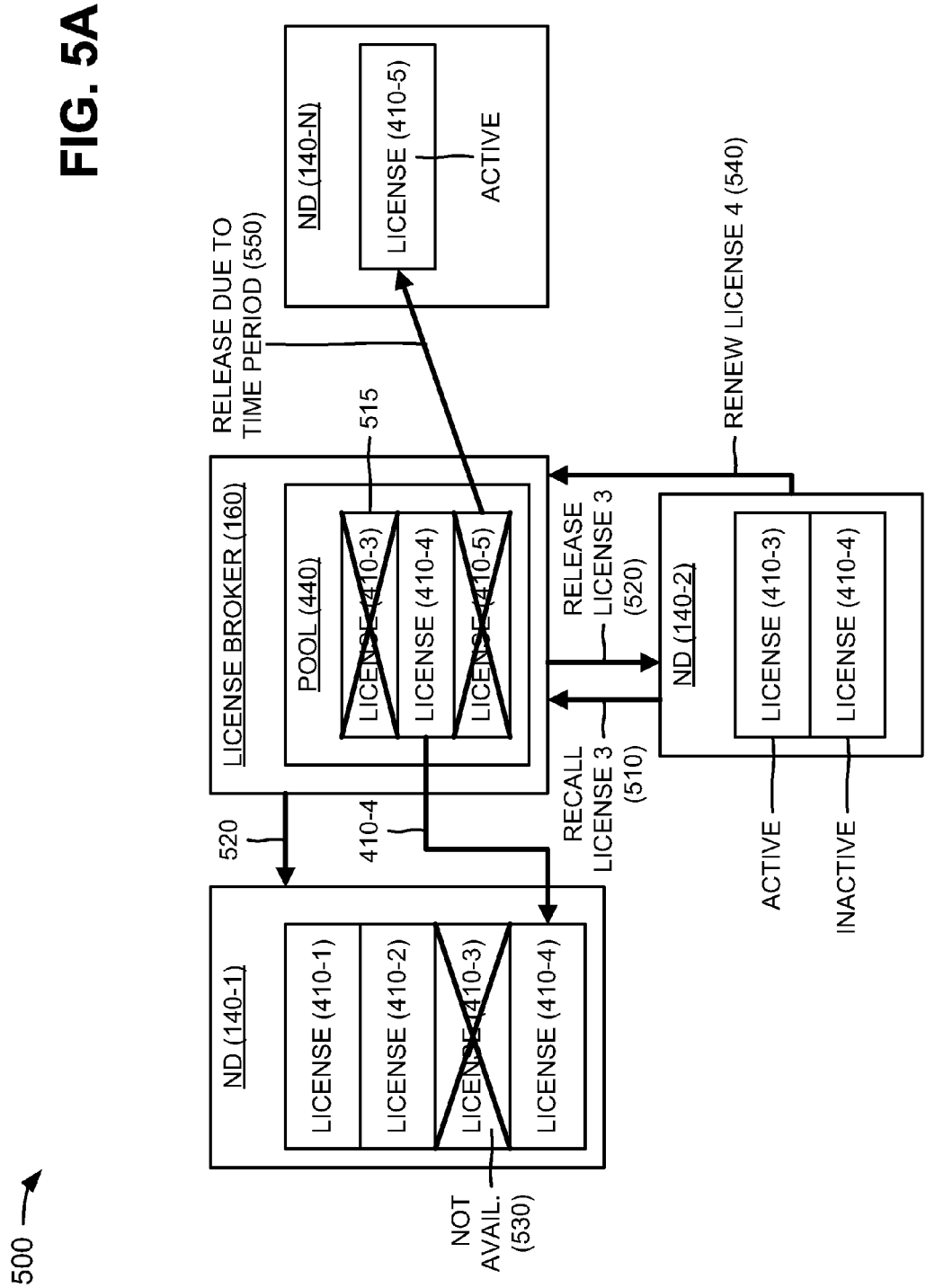

FIGS. 5A and 5B are diagrams of example operations capable of being performed by another example portion 500 of network 100. As shown in FIGS. 5A and 5B, example network portion 500 may include network devices 140-1, 140-2, and 140-N and license broker 160. Network devices 140-1, 140-2, and 140-N and license broker 160 may include the features described above in connection with, for example, one or more of FIGS. 1-4B.

As shown in FIG. 5A, network device 140-2 (e.g., at any time) may recall surrendered license 410-3 from license broker 160, as indicated by reference number 510. Alternatively, network device 140-2 (e.g., at any time) may delete surrendered license 410-3 (e.g., from memory 370). Recalling or deleting surrendered license 410-3 by network device 140-2 may immediately make license 410-3 unavailable at license broker 160, as indicated by reference number 515. As further shown in FIG. 5A, license broker 160 may receive recall 510 from network device 140-2, and may release license 410-3 from pool 440 of available licenses, as indicated by reference number 520. License broker 160 may provide an indication of release 520 of license 410-3 to network device 140-1, and license 410-3 may not be available to network device 140-1, as indicated by reference number 530. License broker 160 may also provide an indication of release 520 of license 410-3 to network device 140-2, and network device 140-2 may make license 410-3 active.

As discussed above, once a license has been surrendered by a particular network device 140, the particular network device 140 surrendering the license may periodically contact license broker 160 to renew the license surrender. For example, as shown in FIG. 5A, network device 140-2 may renew surrendered license 410-4 with license broker 160, as indicated by reference number 540. Since license 410-3 is no longer available, network device 140-1 may provide a request (not shown) for a license to license broker 160, and license broker 160 may provide (e.g., based on the request) an unused license (e.g., license 410-4) from pool 440 of available licenses to network device 140-1. Network device 140-1 may receive license 410-4, and may store license 410-4 (e.g., in memory 370).

As further discussed above, if a particular network device 140 does not renew a surrender of a license within a time period (e.g., a configurable time period set by a network administrator), license broker 160 may assume that the license is no longer surrendered and may release the license from pool 440 of available licenses. For example, as shown in FIG. 5A, network device 140-N may not renew surrendered license 410-5 with license broker 160 before the renewal time period, associated with surrendered license 410-5, expires. Thus, license broker 160 may assume that license 410-5 is no longer surrendered, and may release license 410-5 from pool 440 of available licenses, as indicated by reference number 550. License broker 160 may provide an indication of release 550 of license 410-5 to network device 140-N, and network device 140-N may make license 410-5 active.

As shown in FIG. 5B, licenses 410-3 and 410-5 may be removed from pool 440 of available licenses based on the operations described above in connection with FIG. 5A. As further shown in FIG. 5B, network device 140-2 may delete license 410-4 (e.g., from memory 370), as indicated by reference number 560, and may provide an indication 570 of the deletion of license 410-4 to license broker 160. License broker 160 may receive indication 570 of the deletion of license 410-4, and may immediately make license 410-4 unavailable at license broker 160, as indicated by reference number 580. License broker 160 may provide an indication of unavailability 580 of license 410-4 to network device 140-1, and license 410-4 may not be available to network device 140-1, as indicated by reference number 590.

Although FIGS. 5A and 5B show example components of network portion 500, in other implementations, network portion 500 may include fewer components, different components, differently arranged components, or additional components than depicted in FIGS. 5A and 5B. Alternatively, or additionally, one or more components of network portion 500 may perform one or more other tasks described as being performed by one or more other components of network portion 500.

FIG. 6 is a flow chart of an example process 600 for distributing and sharing licenses across network devices in a VPN according to implementations described herein. In one implementation, process 600 may be performed by license broker 160. In another implementation, some or all of process 600 may be performed by another device in conjunction with license broker 160.

As illustrated in FIG. 6, process 600 may include creating a pool of available licenses for secure network resources (block 610), receiving an unused license from a network device (block 620), and providing the unused license in the pool of available licenses (block 630). For example, in implementations described above in connection with FIG. 4B, license broker 160 may include pool 440 of licenses available to network devices 140. In one example, license broker 160 may create and store pool 440 in a storage device (e.g., storage device 250) associated with license broker 160. Network device 140-2 may surrender licenses 410-3 and 410-4 (e.g., since they are unused) to license broker 160, as indicated by reference 450. License broker 160 may receive licenses 410-3 and 410-4, and may provide licenses 410-3 and 410-4 in pool 440. Network device 140-N may surrender license 410-5 (e.g., since it is unused) to license broker 160, as indicated by reference number 460. License broker 160 may receive license 410-5, and may provide license 410-5 in pool 440.

As further shown in FIG. 6, process 600 may include receiving a request for a license from another network device (block 640), and providing, to the other network device, the unused license from the pool of available licenses (block 650). For example, in implementations described above in connection with FIG. 4B, since network device 140-1 may need another license to handle request 420-3, network device 140-1 may provide request 470 for a license to license broker 160. License broker 160 may receive license request 470, and may retrieve (e.g., based on license request 470) an unused license (e.g., license 410-3) from pool 440 of available licenses. License broker 160 may provide license 410-3 to network device 140-1, and network device 140-1 may receive and store (e.g., in memory 370) license 410-3.

Returning to FIG. 6, process 600 may include determining whether a time period associated with use of the unused license has expired or whether the unused license has been recalled or deleted (block 660). If the time period has expired or the unused license has been recalled or deleted (block 660—YES), process 600 may include releasing the unused license from the pool of available licenses (block 670). Otherwise (block 660—NO), process 700 may include maintaining the unused license in the pool of available licenses (block 680). For example, in implementations described above in connection with FIG. 5A, network device 140-2 (e.g., at any time) may recall surrendered license 410-3 from license broker 160, as indicated by reference number 510. Alternatively, network device 140-2 (e.g., at any time) may delete surrendered license 410-3 (e.g., from memory 370). Recalling or deleting surrendered license 410-3 by network device 140-2 may immediately make license 410-3 unavailable at license broker 160, as indicated by reference number 515. License broker 160 may receive recall 510 from network device 140-2, and may release license 410-3 from pool 440 of available licenses, as indicated by reference number 520. Once a license has been surrendered by a particular network device 140, the particular network device 140 surrendering the license may periodically contact license broker 160 to renew the license surrender. If a particular network device 140 does not renew a surrender of a license within a time period (e.g., a configurable time period set by a network administrator), license broker 160 may assume that the license is no longer surrendered and may release the license from pool 440 of available licenses.

FIG. 7 is a flow chart of another example process 700 for distributing and sharing licenses across network devices in a VPN according to implementations described herein. In one implementation, process 700 may be performed by one of network devices 140. In another implementation, some or all of process 700 may be performed by another device in conjunction with one or network devices 140.

As illustrated in FIG. 7, process 700 may include receiving, from a client device, a request for a secure network resource (block 710), requesting a license from a license broker (block 720), receiving a license from the license broker (block 730), and providing the secure network resource, via the license, to the client device (block 740). For example, in implementations described above in connection with FIGS. 4A and 4B, client device 110-1 may provide request 420-1 for a secure network resource to network device 140-1. Client devices 110-2 and 110-3 may also provide requests 420-2 and 420-3, respectively, for secure network resources to network device 140-1. Since network device 140-1 may need another license to handle request 420-3, network device 140-1 may provide request 470 for a license to license broker 160. License broker 160 may retrieve (e.g., based on license request 470) an unused license (e.g., license 410-3) from pool 440 of available licenses. License broker 160 may provide license 410-3 to network device 140-1, and network device 140-1 may receive and store (e.g., in memory 370) license 410-3. Network device 110-1 may provide a secure response 430-3 to request 420-3, via license 410-3. In one example, response 430-3 may include access to the requested secure network resources (e.g., requested by request 420-3).

As further shown in FIG. 7, process 700 may include surrendering an unused license to the license broker (block 750), and making the unused license inactive (block 760). For example, in implementations described above in connection with FIG. 4B, network device 140-2 may surrender licenses 410-3 and 410-4 (e.g., since they are unused) to license broker 160, as indicated by reference 450. After surrendering licenses 410-3 and 410-4, network device 140-2 may render licenses 410-3 and 410-4 inactive. Network device 140-N may surrender license 410-5 (e.g., since it is unused) to license broker 160, as indicated by reference number 460. After surrendering license 410-5, network device 140-N may render license 410-5 inactive.

Returning to FIG. 7, process 700 may include one of recalling or deleting the unused license in order to make the unused license inactive at the license broker (block 770), renewing the surrender of the unused license within a time period (block 780), or failing to renew surrender of the unused license within the time period (block 790). For example, in implementations described above in connection with FIGS. 5A and 5B, network device 140-2 (e.g., at any time) may recall surrendered license 410-3 from license broker 160, as indicated by reference number 510. Alternatively, network device 140-2 (e.g., at any time) may delete surrendered license 410-3 (e.g., from memory 370). Recalling or deleting surrendered license 410-3 by network device 140-2 may immediately make license 410-3 unavailable at license broker 160, as indicated by reference number 515. If a particular network device 140 does not renew a surrender of a license within a time period (e.g., a configurable time period set by a network administrator), license broker 160 may assume that the license is no longer surrendered and may release the license from pool 440 of available licenses. In one example, network device 140-N may not renew surrendered license 410-5 with license broker 160 before the renewal time period, associated with surrendered license 410-5, expires. Thus, license broker 160 may assume that license 410-5 is no longer surrendered, and may release license 410-5 from pool 440 of available licenses, as indicated by reference number 550.

Systems and/or methods described herein may distribute and share licenses across multiple network devices provided in a VPN. The systems and/or methods may permit network devices (e.g., with lighter loads) to surrender unused licenses to an intermediary device (e.g., a license broker) that provides the unused licenses to other network devices (e.g., with heavier loads and in need of licenses). In one example, the license broker may redistribute the unused licenses to network devices most in need of licenses. Each network device surrendering an unused licenses may recall the unused license (or delete the unused license) at any time, which may make the unused license unavailable at the license broker.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    creating, by a computing device, a pool of available licenses for secure network resources;
    receiving, by the computing device and from a first network device, a particular license that is not being used by the first network device;
    providing, by the computing device, the particular license in the pool of available licenses;

receiving, by the computing device, a request for a license from a second network device;

providing, by the computing device and to the second network device, the particular license from the pool of available licenses based on the request for the license;

determining, by the computing device and after providing the particular license to the second network device, that the particular license is no longer available to be distributed by the computing device;

releasing, by the computing device, the particular license from the pool of available licenses after determining that the particular license is no longer available to be distributed by the computing device; and providing, by the computing device and to the second network device, an indication of the releasing of the particular license from the pool of available licenses.

2. The method of claim 1, where determining that the particular license is no longer available to be distributed by the computing device includes:

determining that the particular license has been recalled by the first network device, and determining that the particular license is no longer available to be distributed by the computing device based on the particular license having been recalled by the first network device.

3. The method of claim 1, where determining that the particular license is no longer available to be distributed by the computing device includes:

determining that the particular license has been deleted by the first network device, and determining that the particular license is no longer available to be distributed by the computing device based on the particular license having been deleted by the first network device.

4. The method of claim 1, where determining that the particular license is no longer available to be distributed by the computing device includes:

determining that a time period, associated with receipt of the particular license, has expired, and determining that the particular license is no longer available to be distributed by the computing device based on the time period having expired.

5. The method of claim 1, where the indication prevents the second network device from using the particular license.

6. The method of claim 1, where the computing device comprises a license broker for a plurality of network devices associated with a plurality of virtual private networks (VPNs), and where the plurality of network devices include the first network device and the second network device.

7. A computing device comprising:

a memory; and a processor, coupled to the memory, to:

create a pool of available licenses for secure network resources, receive, from one or more network devices, a plurality of licenses that are not being used by the one or more network devices, provide the plurality of licenses in the pool of available licenses, allocate a particular license, of the plurality of licenses, to a particular network device, determine, after allocating the particular license to the particular network device, that the particular license is no longer available to be allocated by the computing device, release the particular license from the pool of available licenses after determining that the particular license is no longer available to be allocated by the computing device, and provide, to the particular network device, an indication of the particular license being released from the pool of available licenses.

8. The computing device of claim 7, where, when allocating the particular license, the processor is to:

receive a request from the particular network device, and allocate, based on the request and to the particular network device, the particular license.

9. The computing device of claim 7, where, when determining that the particular license is no longer available to be allocated by the computing device, the processor is to:

determine that the particular license has been recalled by one of the one or more network devices that provided the particular license to the computing device, and determine that the particular license is no longer available to be allocated by the computing device based on the particular license having been recalled.

10. The computing device of claim 7, where, when determining that the particular license is no longer available to be allocated by the computing device, the processor is to:

determine that the particular license has been deleted by one of the one or more network devices that provided the particular license to the computing device, and determine that the particular license is no longer available to be allocated by the computing device based on the particular license having been deleted.

11. The computing device of claim 7, where, when determining that the particular license is no longer available to be allocated by the computing device, the processor is to:

determine that a time period, associated with receipt of the particular license from one of the one or more network devices, has expired, and determine that the particular license is no longer available to be allocated by the computing device based on the time period having expired.

12. The computing device of claim 7, where the indication prevents the particular network device from continuing to use the particular license.

13. The computing device of claim 7, where the computing device comprises a license broker for a plurality of network devices associated with a plurality of virtual private networks (VPNs), and where the plurality of network devices include the one or more network devices and the particular network device.

14. A method comprising:

receiving, by a network device and from a client device, a request for a resource;

requesting, by the network device and based on the request, a first license from a license broker device;

receiving, by the network device, the first license from the license broker device;

providing, by the network device and to the client device, access to the resource based on the first license;

determining, by the network device, that a second license, stored in the network device, is not being used by the network device;

surrendering, by the network device, the second license to the license broker device based on the second license not being used by the network device; and contacting, by the network device and without the licensing broker device initiating contact with the network device after the surrendering of the second license and before the contacting by the network device, the license broker device to renew the surrendering of the second license to prevent the license broker device from releasing the second license back to the network device.

15. The method of claim 14, where the first license enables the network device to securely provide the resource to the client device.

16. The method of claim 14, further comprising:
making the second license inactive in the network device after surrendering the second license to the license broker device.

17. The method of claim 14, further comprising:
recalling the second license from the license broker device; and
making the second license active in the network device after recalling the second license from the license broker device.

18. The method of claim 14, further comprising:
deleting the second license from the network device,
deleting the second license making the second license unavailable to be distributed by the license broker device.

19. The method of claim 14, where contacting the license broker device to renew the surrendering of the second license includes:
contacting the license broker device to renew the surrendering within a particular time period after which the second license is to be released when the surrendering is not renewed.

20. The method of claim 14, further comprising:
making the second license active in the network device after failing to renew the surrendering of the second license to the license broker device within a particular time period from a time of the renewing of the surrendering of the second license.

21. A network device comprising:
a memory; and
a processor, coupled to the memory, to:
receive, from a client device, a request,
request, based on the request, a first license from a license broker device,
receive the first license from the license broker device,
provide, to the client device, access to a secure network resource based on the first license,
determine that a second license is not being used by the network device,
surrender the second license to the license broker device based on the second license not being used by the network device, and
contact, without the licensing broker device initiating contact with the network device after the surrendering of the second license and before the contacting by the network device, the license broker device to renew the surrendering of the second license in order to prevent the license broker device from releasing the second license back to the network device.

22. The network device of claim 21, where the processor is further to:
render the second license inactive in the network device after surrendering the second license.

23. The network device of claim 21,
where the processor is further to:
recall the second license from the license broker device, or
delete the second license from a memory of the network device,
where deleting or recalling the second license makes the second license unavailable to be distributed by the license broker device.

24. The network device of claim 21, where, when contacting the license broker device to renew the surrendering of the second license, the processor is to:
contact the license broker device to renew the surrendering of the second license, to the license broker device, within a particular time period after which the second license is to be released when the surrendering is not renewed.

25. The network device of claim 21, where the processor is further to:
make the second license active in the network device after the network device fails to renew the surrender of the second license to the license broker device within a particular time period from a time of the renewing of the surrendering of the second license.

* * * * *

UNITED STATES PATENT AND TRADEMARK OFFICE
CERTIFICATE OF CORRECTION

| | | |
|---|---|---|
| PATENT NO. | : 8,955,099 B1 | Page 1 of 1 |
| APPLICATION NO. | : 12/960243 | |
| DATED | : February 10, 2015 | |
| INVENTOR(S) | : Kanti Varanasi et al. | |

It is certified that error appears in the above-identified patent and that said Letters Patent is hereby corrected as shown below:

ON THE TITLE PAGE

Assignee item (73) delete "Juniper Networks, Inc.," and insert -- Pulse Secure, LLC --.

Signed and Sealed this
Eighth Day of March, 2016

Michelle K. Lee
*Director of the United States Patent and Trademark Office*